(12) United States Patent
Klee et al.

(10) Patent No.: US 9,766,920 B2
(45) Date of Patent: Sep. 19, 2017

(54) DYNAMIC CONTENT DISK

(71) Applicant: VMware, Inc., Palo Alto, CA (US)

(72) Inventors: Christoph Klee, Snoqualmie, WA (US); Aman Nijhawan, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 76 days.

(21) Appl. No.: 14/839,862

(22) Filed: Aug. 28, 2015

(65) Prior Publication Data

US 2017/0060610 A1 Mar. 2, 2017

(51) Int. Cl.
*G06F 3/06* (2006.01)
*G06F 9/455* (2006.01)

(52) U.S. Cl.
CPC .......... *G06F 9/45558* (2013.01); *G06F 3/065* (2013.01); *G06F 3/0619* (2013.01); *G06F 3/0665* (2013.01); *G06F 3/0689* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 7,447,854 B1 * | 11/2008 | Cannon | ............... | G06F 11/1451 711/162 |
| 8,156,306 B1 * | 4/2012 | Raizen | ................... | G06F 3/0608 707/813 |
| 8,631,423 B1 * | 1/2014 | Indalkar | ............... | G06F 9/45558 719/328 |
| 2008/0270674 A1 * | 10/2008 | Ginzton | ............... | G06F 9/45533 711/6 |
| 2009/0106493 A1 * | 4/2009 | Tsuji | ...................... | G06F 3/0605 711/114 |
| 2010/0235831 A1 * | 9/2010 | Dittmer | ............... | G06F 9/45558 718/1 |
| 2010/0299667 A1 * | 11/2010 | Ahmad | ............... | G06F 12/1018 718/1 |
| 2011/0145496 A1 * | 6/2011 | Whaley | ................. | G06F 9/4401 711/112 |
| 2012/0284234 A1 * | 11/2012 | Mashtizadeh | ..... | G06F 17/30233 707/655 |
| 2012/0304168 A1 * | 11/2012 | Raj Seeniraj | ......... | G06F 9/4445 718/1 |

(Continued)

OTHER PUBLICATIONS

U.S. Appl. No. 14/477,692, filed Sep. 4, 2014.

*Primary Examiner* — Mano Padmanabhan
*Assistant Examiner* — Jean Edouard (57) ABSTRACT

A dynamic content disk for a virtual computing instance is created as a thinly-provisioned virtual disk having a file system that is synthesized in accordance with a set of applications that are provisioned for a virtual machine (VM). To limit the allocated size of the dynamic content disk, a filter is attached to the dynamic content disk to intercept input-output operations (IOs) directed to the dynamic content disk and convert them to IOs directed to an application virtual disk that stores the actual files of the applications that are provisioned for the VM. The application virtual disk may be stored on different back-ends, such as storage area network (SAN), network file system, virtual SAN, cloud storage, or local storage.

20 Claims, 6 Drawing Sheets

(56) References Cited

U.S. PATENT DOCUMENTS

2012/0324181 A1* 12/2012 Garthwaite ......... G06F 12/1081
　　　　　　　　　　　　　　　　　　　　　　　　711/159
2013/0185723 A1* 7/2013 Joshi ................ G06F 17/30194
　　　　　　　　　　　　　　　　　　　　　　　　718/1
2013/0198468 A1* 8/2013 Antony ............... G06F 11/3442
　　　　　　　　　　　　　　　　　　　　　　　　711/162
2015/0121059 A1 4/2015 Davis \* cited by examiner

DYNAMIC CONTENT DISK

BACKGROUND

Traditional virtual desktop environments supported by virtual machines (VM) present a fixed set of pre-installed applications and files to a user. Typically, the user is unable to request customizations of the environment itself to accommodate a sudden need for a new set of applications. One main reason for this restriction is that the user environment is cloned from a base image that has the applications installed, or in more dynamic environments, the application set might be based on the groups a user belongs to and what the application needs are for these groups.

A new set of applications may be provided by adding virtual disks to a particular user's VM, but the VM is usually restricted in the number of virtual disks it can support, in part because booting up the VM with too many virtual disks can impact the power-on performance of the VM. As a result, a single virtual disk is typically configured to cover a large set of applications, and the set of applications that can be presented to the user is not very flexible. Furthermore, in contrast to virtual desktop environments where the need for a diverse set of applications might not be a major issue, it becomes a bigger issue in cloud environments where the user base might have very diverse application requirements.

DETAILED DESCRIPTION

Embodiments provide a dynamic content disk for a virtual machine (VM) (or other virtual computing instances, such as containers that do not have an operating system), that is created as a thinly-provisioned virtual disk having a file system that is synthesized in accordance with a set of applications that are provisioned for the VM. To limit the allocated size of the dynamic content disk, an IO filter is attached to the dynamic content disk to intercept IOs directed to the dynamic content disk and convert them to IOs directed to an application virtual disk that stores the actual files of the applications that are provisioned for the VM. According to embodiments, the application virtual disk may be stored in different back-ends, such as storage area network (SAN), network file system (NFS), virtual SAN, cloud storage, or local storage.

In the embodiments described herein, IO filters are plug-ins/pluggable code modules that are able to intercept and, if applicable, modify VM IO requests directed to corresponding virtual disks owned by the VMs. One or more sidecar files are created when an IO filter is attached to a virtual disk to allow the IO filter to store the metadata of the IO filter. These sidecar files migrate with the corresponding virtual disk and their state is preserved along with the state of the corresponding virtual disk during a snapshot operation.

Figure 1:
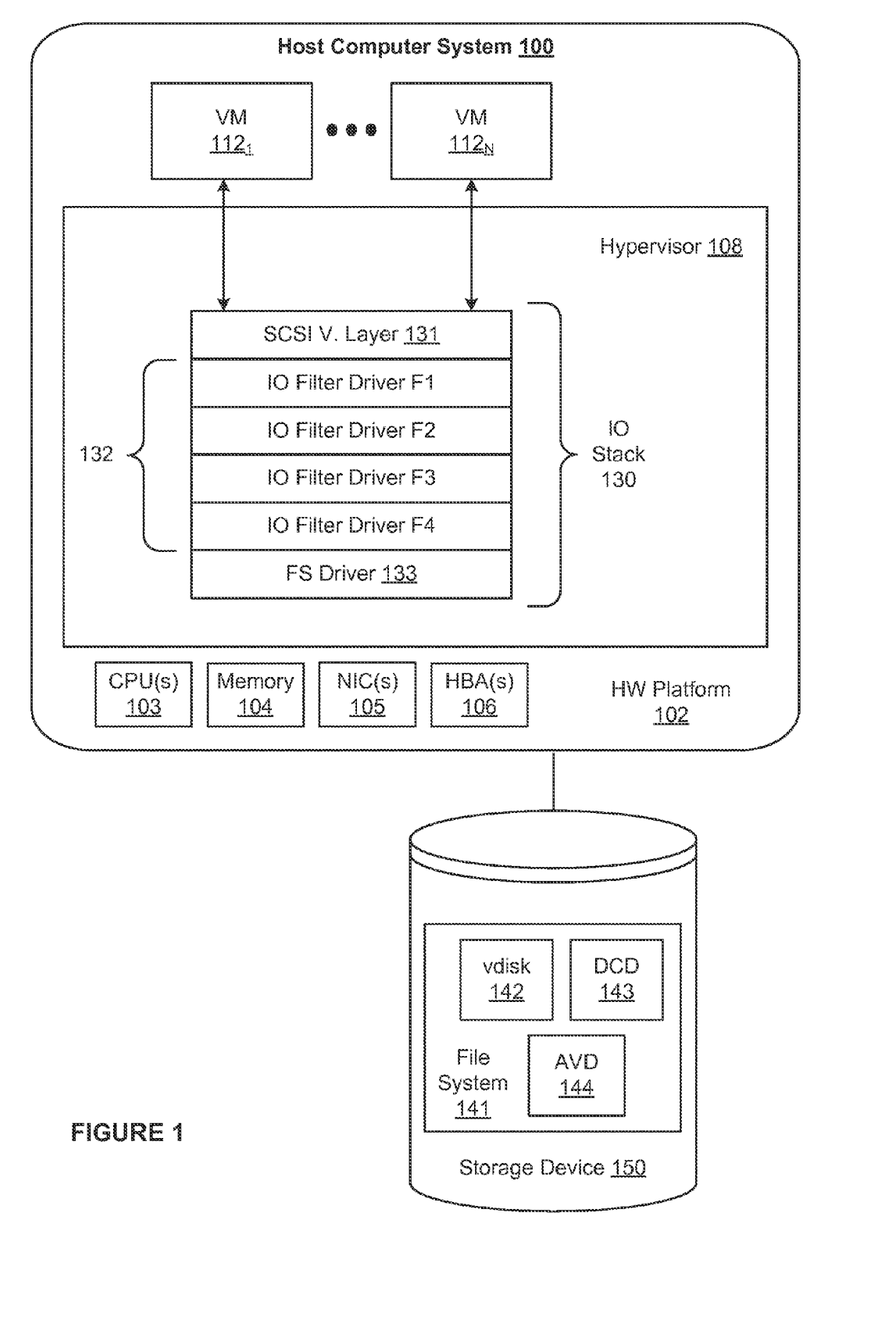
FIG. 1 is a computer system in which a dynamic content disk according to embodiments may be implemented.

FIG. 1 is a computer system, shown as host computer system 100 in which a virtualization software, referred to herein as hypervisor 108. Host computer system 100 may be constructed on a conventional, typically server-class, hardware platform 102, and includes one or more central processing units (CPUs) 103, system memory 104, one or more network interface controllers (NICs) 105 that connect host computer 100 to a network, and one or more host bus adapters (HBAs) 106 that connect host computer 102 to a persistent storage device, illustrated herein as storage device 150. Persistent storage device may be provided locally in host computer 100 or through the network by a networked-attached storage device.

Hypervisor 108 supports the execution of virtual computing instances which, in the embodiment illustrated herein, are virtual machines (VMs) $112_1$-$112_N$. These VMs each have one or more virtual disks, which are provisioned in a file system 141 of host computer 100 as files. In FIG. 1, virtual disk (vdisk) 142, dynamic content disk (DCD) 143, and application virtual disk (AVD) are each shown as a file of file system 141, where vdisk 142 operates as a virtual disk for a VM, e.g., VM $112_1$, and DCD 143 operates as a dynamic content disk for the VM to which an IO filter, hereinafter referred to as a synthetic block device (SBD) filter, is attached. When the SBD filter is attached to a virtual disk, such as DCD 143, the contents thereof are defined according to the configuration of the SBD filter. In one embodiment, an administrator specifies the SBD filter configuration to define a set of applications that are provisioned for a VM through a storage policy. AVD 144 stores metadata and data blocks of files that make up applications that may be provisioned for the VM.

IOs issued by any one of the VMs 112 are processed through IO stack 130 that is configured in hypervisor 108. At the top of IO stack 130 is a SCSI virtualization layer 131, which translates IOs from the VMs targeting a particular virtual disk and translates them into IOs directed at a file in file system 141 corresponding to the virtual disk, e.g., vdisk 142 or DCD 143. Hypervisor 108 employs IO filter drivers 132 that are external to a host file system (FS) driver 133 to provide various IO filter functions, such as encryption, compression, caching (e.g., write-back caching), antivirus, and others. Filter drivers 132 examine the translated IOs from SCSI virtualization layer 131 and intercept read/write command and data for associated filter processing. In the embodiments illustrated herein, an SBD filter driver is implemented as one of IO filter drivers 132, in particular as IO filter driver F1.

Figure 2:
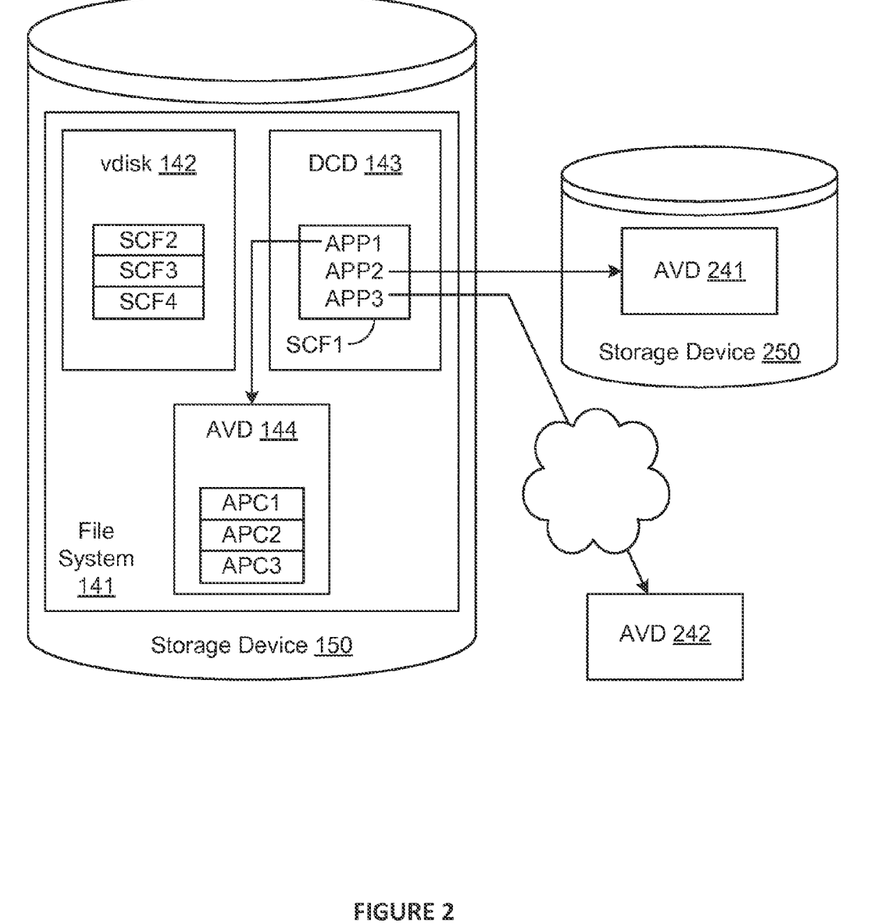
FIG. 2 is a conceptual diagram that illustrates potential content sources for the dynamic content disk.

An IO filter may be attached to any virtual disk and in the example given herein, IO filters associated with IO filter drivers F2, F3, and F4 are attached to vdisk 142, and the SBD filter, which is the IO filter associated with IO filter driver F1, is attached to DCD 143. Accordingly, in FIG. 2, three sidecar files, SCF2, SCF3, and SCF4 are shown for vdisk 142, and one sidecar file SCF1 is shown for DCD 143. The sidecar file SCF1 for DCD 143 stores metadata that defines a set of applications that are provisioned for a VM through DCD 143. To illustrate that the metadata and data of the provisioned applications may be sourced from different back-ends, FIG. 2 shows APP1 being sourced from AVD 144, APP2 from a different storage device 250, and APP3 from cloud storage 242. In the description of the embodiments below, it is assumed that each of the applications is sourced from AVD 144.

AVD 144 stores the metadata and data of different applications in units of application package chunks (APCs). Each APC segment corresponds to one application and includes a segment header, index node section, and a data section. The segment header is stored at offset 0 of an APC segment. It stores information about the APC segment, for example, how many index nodes and data blocks are used by the APC segment, and offsets to the beginning of the index node section, and the data section. The index node section contains metadata about the files of the application, including the name and size of each file, and pointers to the starting offset of the data blocks of the file stored in the data section. The data section contains the actual data blocks of the files.

Figure 3:
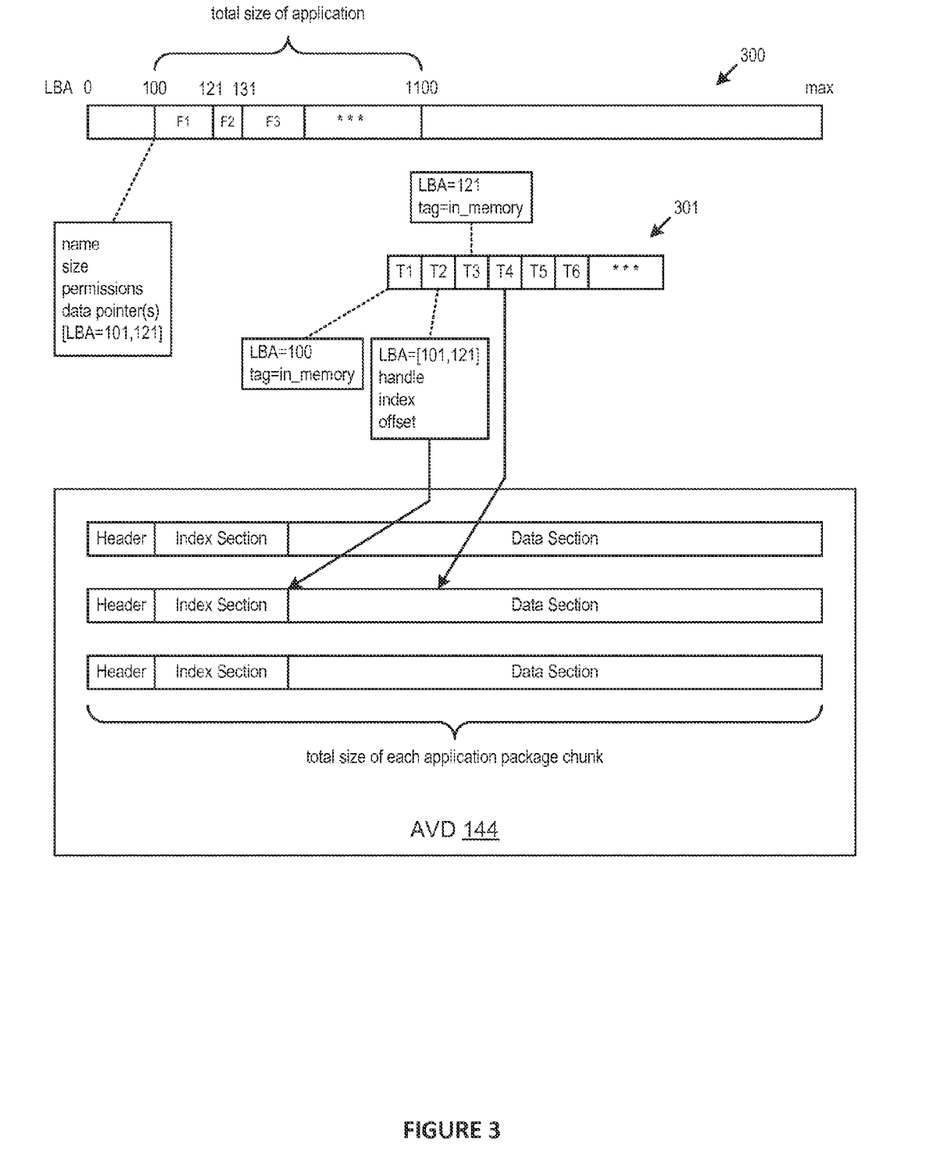
FIG. 3 is a conceptual diagram that illustrates an address space of a file system that is synthesized for the dynamic content disk and tracking objects stored therein that provide mappings to locations of application metadata and data.

FIG. 3 is a conceptual diagram that illustrates an address space of a file system 300 that is synthesized for DCD 143 and tracking objects 301 that provide mappings to locations of application metadata and data that are stored in file system 300 and AVD 144 which, in the example shown, has three APC segments of equal size. Alternatively, the APC segments may be sized to be a multiple of a predetermined size, e.g., 1 GB. In the embodiments, AVD 144 is thinly provisioned so that the APC segments can be oversized without increasing the actual usage of persistent storage space by AVD 144. File system 300 is synthesized in memory; in addition, it is possible to persist a serialized version of synthesized file system 300 in storage and store it in the sidecar file SCF1. File system 300 has a logical block address (LBA) space extending from LBA=-0 to LBA=max. DCD 143 is also thinly provisioned so the max LBA can be oversized to accommodate anticipated application needs without increasing the actual usage of persistent storage space.

The LBA space of file system 300 occupied by an application installed in a VM includes the LBA space for the metadata and data blocks of the files of the application. The total size of the application is indicated in FIG. 3. The metadata of the files of the application (three files are shown in FIG. 3 as F1, F2, and F3) are read from the index section of the corresponding APC segment in AVD 144 and synthesized in file system 300 at LBA=100 for file F1, LBA=121 for file F2, and LBA=131 for file F3. The contents of the metadata include, inter alia, the file name, the file size, access rights to the file, and pointers to where data is stored in file system 300. In the example of metadata for file F1, the pointers to where data is stored in file system 300 reference LBA range [101, 121]. However, actual data are not stored at this LBA range in the embodiments. Instead, a tracking object is created for this LBA range and for each of the other LBA ranges specified in other metadata. These tracking objects are shown in FIG. 3 as T2, T4, and T6 and each includes a pointer to a data section of the corresponding APC segment. The pointer is defined by a file handle that corresponds to AVD 144 and an offset into AVD 144. It should be recognized that larger files may not be able to get laid out as one contiguous LBA range on the synthesized file system, because they might get interrupted by metadata keeping track of the file. A separate tracking object is created for each contiguous LBA range, and each such tracking object maps to the corresponding location of the application data in AVD 144.

Additional tracking objects are created for the metadata, and these tracking objects are shown as T1, T3, and T5 in FIG. 3, and include the LBA range of the metadata in file system 300 and a special tag that indicates that the metadata is stored in memory. In one embodiment, the tracking objects created for the metadata and the actual data blocks of files of a provisioned application are organized into a tree data structure, e.g., a binary or B-tree, so that the SBD filter driver can intercept and quickly process IOs targeting a certain LBA or LBA range by traversing the tree data structure. A traversal of all tracking objects, in response to a read IO request, is expected to yield the location of the requested data. If a tracking object covers the requested range, the SBD filter driver returns the data retrieved from the location described in the tracking object. If no tracking object covers the requested range, the SBD filter driver returns a zero-filled buffer.

Figure 4:
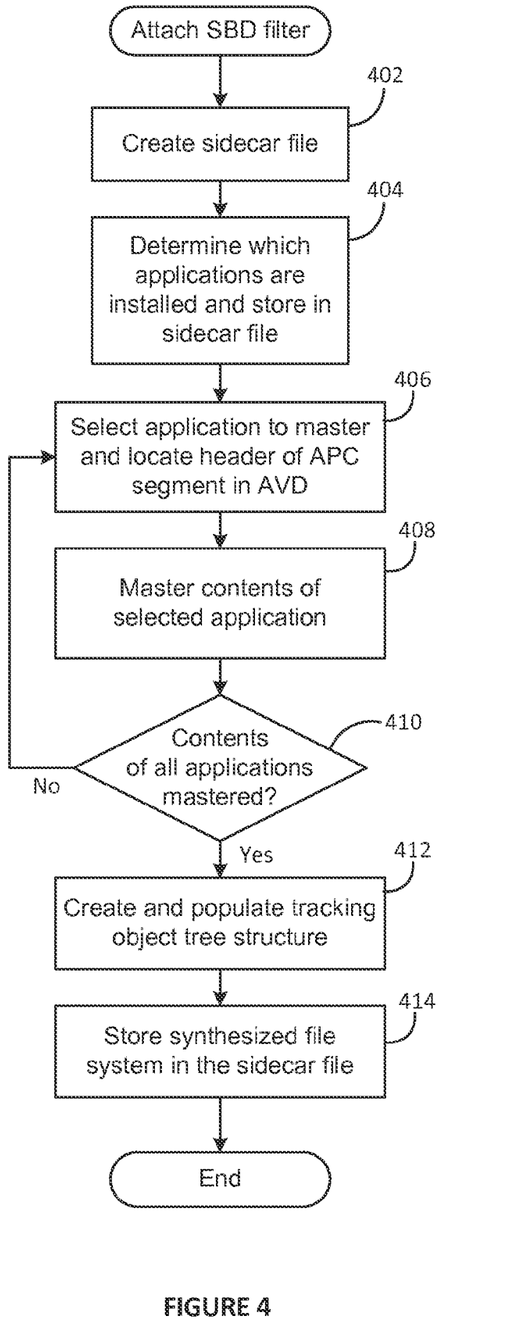
FIG. 4 is a flow diagram that illustrates steps carried out in the computer system when an input-output operation (IO) filter is attached to the dynamic content disk.

FIG. 4 is a flow diagram that illustrates steps carried out by the SBD filter driver when the SBD filter is attached to DCD 143. The method begins at step 402 where the SBD filter driver creates a sidecar file, e.g., SCF1, for DCD 143 that contains metadata of the SBD filter. At step 404 the SBD filter driver determines which applications are to be provisioned, and stores that information in the sidecar file. In one embodiment, this step is carried out by reading one or more tuples of (path to AVD, index number, package hash, regex include, regex exclude) that are specified in a storage policy-based management file, and storing these tuples in the sidecar file. Each tuple corresponds to an application to be provisioned. The "path to AVD" specifies a file path to the application virtual disk, e.g., AVD 144, that contains the metadata and actual data blocks of all the applications. The "index number" is an index into the application virtual disk by which the APC segment corresponding to the application is located. The "package hash" is used as a check to confirm that the APC segment has not been modified. The files to be expressly excluded are specified in "regex exclude" and the files to be expressly included are specified in "regex include."

Steps 406, 408, and 410 are carried out for each provisioned application. At step 406, the SBD filter driver selects an application and, using the "index number" corresponding to the selected application, locates the header of the APC segment corresponding to the selected application in AVD 144. Then, the SBD filter driver masters the contents of the selected application at step 408, the details of which are set forth in FIG. 5. If contents of all applications have been mastered as determined at step 410, the SBD filter driver executes step 412. If not, the flow returns to step 406 and the SBD filter driver repeats steps 406, 408, and 410 for another application.

At step 412, the SBD filter driver creates a tracking object tree structure and populates that structure with the tracking objects created while mastering the contents of the provisioned applications. Then, at step 414, the synthesized file system is saved in the sidecar file, so that the contents of the installed applications need not be re-mastered. Thus, when DCD 143 is closed and opened again, the file system for DCD 143 can be synthesized by loading the saved contents into memory instead of re-mastering the contents of the installed applications.

Figure 5:
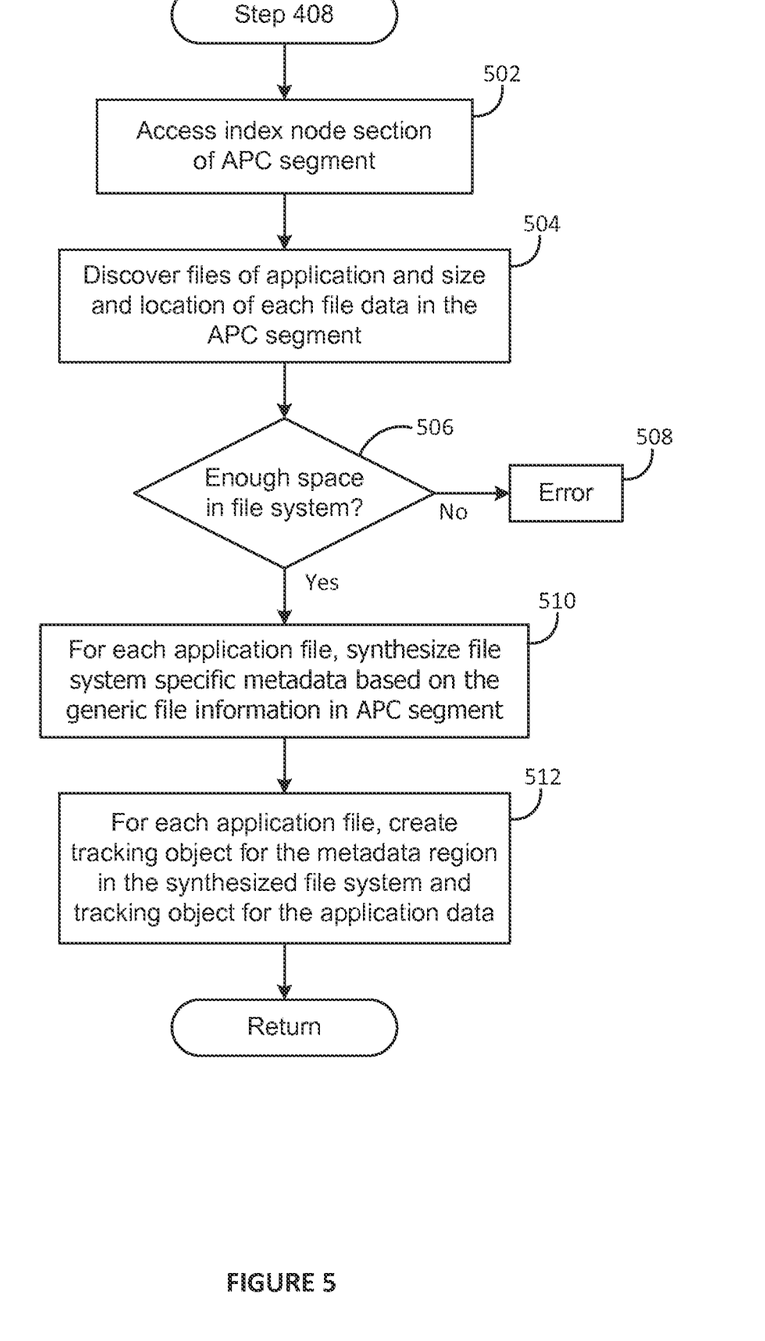
FIG. 5 is a flow diagram that illustrates a method of mastering contents of an application provisioned through the dynamic content disk.

FIG. 5 is a flow diagram that illustrates a method of mastering contents of a provisioned application, which is step 408 in FIG. 4. The method begins at step 502, where the SBD filter driver accesses the index node section of an APC segment in AVD 144 corresponding to the installed application. Then, at step 504, the SBD filter driver reads the index section and discovers names and sizes of the files of the installed application, as well as the location of data blocks of each file in the APC segment. Step 506 is a check that the SBD filter driver performs to see if the total size of the metadata and data blocks of the files of the installed application exceeds the remaining capacity of the synthesized file system. If there is sufficient space, flow proceeds to step 510. Otherwise, an error message is returned at step 508.

At step 510, the SBD filter driver synthesizes file system specific metadata based on the generic file information provided in the index section of the APC segment and stores the synthesized metadata in a particular LBA or LBA range of the synthesized file system. Then, at step 512, for each file of the provisioned application, the SBD filter driver creates one or more tracking objects for the metadata regions in memory. This metadata tracking object includes the LBA range of the metadata in the synthesized file system and a special tag indicating that the metadata is stored in memory. In addition, instead of storing the actual data blocks of the file in file system 300, the SBD filter driver creates one or more tracking objects for the LBA range(s) in the synthesized file system in which the actual data blocks of the file are designated to be stored. Each such data tracking object includes the designated LBA range and a pointer to the data section in the APC segment that contains the actual data of the file, which as described above is defined as a file handle of AVD 144 and an offset.

Figure 6:
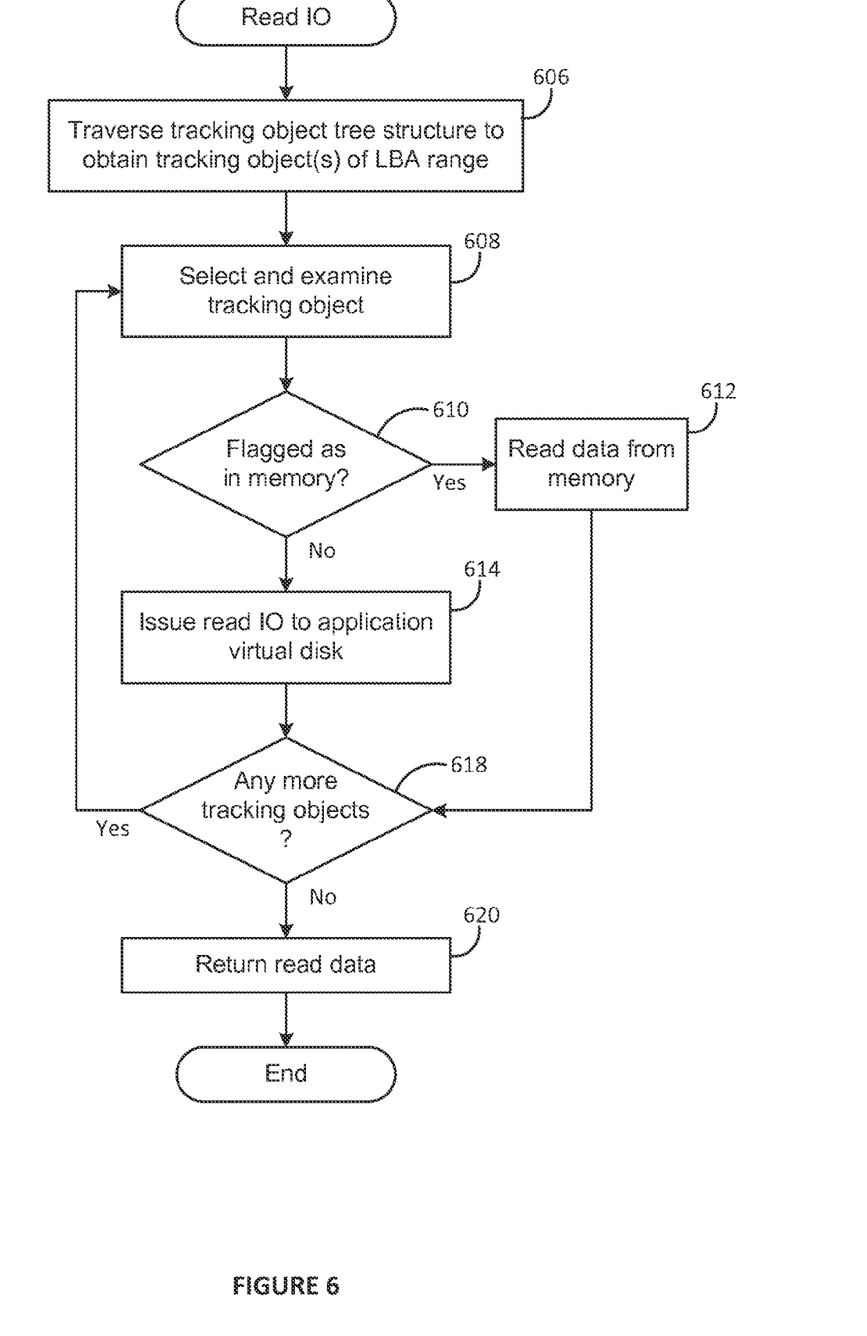
FIG. 6 is a flow diagram that illustrates a method of reading application metadata or data from the dynamic content disk.

FIG. 6 is a flow diagram that illustrates a method of reading application metadata or data blocks from DCD 143. The method begins at step 606, where the SBD filter driver traverses the tracking object tree structure to find tracking objects of the LBA range that covers the IO request. For an LBA range that is not covered by any tracking object, the SBD filter driver returns a zero-filled buffer.

For each tracking object found at step 606 that covers the IO request, the SBD filter driver carries out the following steps. At step 608, the tracking object is examined. If the tracking object has the special tag indicating that the metadata is stored in memory as determined at step 610, the metadata is read from memory at step 612. Otherwise, the SBD filter driver issues a read IO to AVD 144 targeting the data location specified in the tracking object at step 614. After reading the data at step 612 or through step 614, the SBD filter driver determines at step 618 whether there are more tracking objects to examine. If there are, step 608 and the steps that follow step 608 are repeated as described above. Otherwise, the SBD filter driver returns the read data at step 620 to the requesting VM, and thereafter, the process terminates.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer system having a virtual computing instance executed therein, comprising:
   a processing unit having a virtualization software executed therein to support execution of the virtual computing instance; and
   a storage device comprising a first virtual disk and an application virtual disk, the first virtual disk being stored by the virtualization software as a file of a host system, wherein the first virtual disk stores tracking objects associated with contents of applications provisioned for the virtual computing instance, wherein each of the tracking objects maps to a location on the application virtual disk, the virtualization software including a filter driver configured to intercept input-output operations (IOs) from the virtual computing instance that are directed to the first virtual disk and convert read IOs directed to the first virtual disk to read IOs directed to the application virtual disk that stores contents of the applications.

2. The computer system of claim 1, wherein the filter driver converts a first read IO, which is directed to the first virtual disk, to a second read IO, which is directed to the application virtual disk by:
   retrieving a mapping to an address space of the application virtual disk corresponding to an address designated in the first read IO; and
   determining location of data in the application virtual disk based on the mapping,
   formulating the second read IO, the formulated second read IO targeting the determined data location in the application virtual disk.

3. The computer system of claim 2, wherein the application virtual disk is stored as a file in the host file system.

4. The computer system of claim 2, wherein the application virtual disk is stored as a file in a different storage device than the storage device.

5. The computer system of claim 1, wherein the virtualization software includes at least one additional filter driver configured to intercept IOs from the virtual computing instance that are directed to the first virtual disk to provide at least one additional IO filter function that includes at least one of encryption, compression, caching, or antivirus check.

6. The computer system of claim 1, wherein the read IOs directed to the first virtual disk include a first read IO to read contents of a file of a first application installed in the virtual computing instance and a second read IO to read contents of a file of a second application installed in the virtual computing instance, and the application virtual disk stores the files of both the first and second applications.

7. The computer system of claim 6, wherein all the files of each application installed in the virtual computing instance are stored as one contiguous segment in an address space of the application virtual disk.

8. The computer system of claim 7, wherein the contiguous segments are sized to be integer multiples of a predetermined size, and the application virtual disk is thinly provisioned.

9. A method of loading an application into memory of a virtual computing instance that is executing in a computer system and issues input-output operations (IOs) to a first virtual disk that is stored as a file of a host file system, said method comprising:
   intercepting, by a filter driver configured to intercept the IOs, a read IO from the virtual computing instance that is directed to the first virtual disk that has been provisioned for applications installed in the virtual computing instance, wherein the first virtual disk is located on a storage device and stores tracking objects associated with content data of applications provisioned for the virtual computing instance, wherein each of the tracking objects maps to a location on an application virtual disk; and
   converting, by the filter driver, the read IO directed to the first virtual disk to a read IO directed to the application virtual disk located on the storage device, or a different storage device, that stores files of one or more of the applications installed in the virtual computing instance, wherein the files stored on the application virtual disk comprise contents of the applications provisioned for the virtual computing instance.

10. The method of claim 9, wherein said converting includes:
    retrieving a mapping to an address space of the application virtual disk corresponding to an address designated in the read IO directed to the first virtual disk;
    determining location of data in the application virtual disk based on the mapping; and
    formulating the read IO directed to the application disk, the formulated read IO targeting the determined data location in the application virtual disk.

11. The method of claim 10, wherein the application virtual disk is stored as a file in the host file system.

12. The method of claim 10, wherein the application virtual disk is stored as a file in the different storage device.

13. The method of claim 9, wherein the read IO directed to the first virtual disk includes one of a first read IO to read contents of a file of a first application installed in the virtual computing instance and a second read IO to read contents of a file of a second application installed in the virtual computing instance, and the application virtual disk stores the files of both the first and second applications.

14. The method of claim 13, wherein all the files of each application installed in the virtual computing instance are stored as one contiguous segment in an address space of the application virtual disk.

15. A non-transitory computer readable medium comprising instructions to be executed in a computer system to cause the computer system to carry out a method of loading an application into memory of a virtual computing instance that is executed in the computer system and issues input-output operations (IOs) to a first virtual disk that is stored as a file of a host file system, said method comprising:

intercepting, by a filter driver configured to intercept the IOs, a read IO from the virtual computing instance that is directed to the first virtual disk that has been provisioned for applications installed in the virtual computing instance, wherein the first virtual disk is located on a storage device and stores tracking objects associated with contents of applications provisioned for the virtual computing instance, wherein each of the tracking objects maps to a location on an application virtual disk; and converting, by the filter driver, the read IO directed to the first virtual disk to a read IO directed to the application virtual disk located on the storage device, or a different storage device, that stores files of one or more of the applications installed in the virtual computing instance, wherein the files stored on the application virtual disk comprise content data of the applications provisioned for the virtual computing instance.

16. The non-transitory computer readable medium of claim 15, wherein said converting includes:

retrieving a mapping to an address space of the application virtual disk corresponding to an address designated in the read IO directed to the first virtual disk;

determining location of data in the application virtual disk based on the mapping; and formulating the read IO directed to the application disk, the formulated read IO targeting the determined data location in the application virtual disk.

17. The non-transitory computer readable medium of claim 16, wherein the application virtual disk is stored as a file in the host file system.

18. The non-transitory computer readable medium of claim 16, wherein the application virtual disk is stored in as a file in the different storage device.

19. The non-transitory computer readable medium of claim 15, wherein the read IO directed to the first virtual disk includes one of a first read IO to read contents of a file of a first application installed in the virtual computing instance and a second read IO to read contents of a file of a second application installed in the virtual computing instance, and the application virtual disk stores the files of both the first and second applications.

20. The non-transitory computer readable medium of claim 19, wherein all the files of each application installed in the virtual computing instance are stored as one contiguous segment in an address space of the application virtual disk.

* * * * *